(12) United States Patent
Kuehnle

(10) Patent No.: US 8,436,902 B2
(45) Date of Patent: May 7, 2013

(54) METHOD AND SYSTEM FOR WEATHER CONDITION DETECTION WITH IMAGE-BASED ROAD CHARACTERIZATION

(75) Inventor: Andreas Kuehnle, Villa Park, CA (US)

(73) Assignee: VALEO Schalter and Sensoren GmbH, Bietigheim-Bissingen (DE)

( * ) Notice: Subject to any disclaimer, the term of this patent is extended or adjusted under 35 U.S.C. 154(b) by 444 days.

(21) Appl. No.: 12/674,925

(22) PCT Filed: Aug. 29, 2008

(86) PCT No.: PCT/EP2008/007072
§ 371 (c)(1),
(2), (4) Date: Feb. 24, 2010

(87) PCT Pub. No.: WO2009/027089
PCT Pub. Date: Mar. 5, 2009

(65) Prior Publication Data
US 2011/0074955 A1    Mar. 31, 2011

Related U.S. Application Data

(60) Provisional application No. 60/966,883, filed on Aug. 30, 2007.

(51) Int. Cl.
  *H04N 7/18*    (2006.01)
  *G06K 9/46*    (2006.01)
  *G06K 9/48*    (2006.01)
  *G06K 9/68*    (2006.01)

(52) U.S. Cl.
  USPC .......... 348/148; 348/149; 348/143; 348/142; 382/194; 382/199; 382/221

(58) Field of Classification Search ............ 348/143, 348/148, 161, 149, 142, 158; 382/104, E07.085, 382/100, 199, 274, 194, 221, 195
See application file for complete search history.

(56) References Cited

U.S. PATENT DOCUMENTS 5,530,651 A * 6/1996 Uemura et al. ............... 701/301
5,762,447 A * 6/1998 Hachiki et al. ................ 404/77
6,254,259 B1 * 7/2001 Kobayashi .................... 362/465
(Continued)

FOREIGN PATENT DOCUMENTS
DE    102005044486 A1    3/2007

OTHER PUBLICATIONS

Kurihata, H., Takahashi, T., Ide, I., Mekada, Y., Murase, H., Tamatsu, Y., and Miyahara, T., "Rainy Weather Recognition from In-Vehicle Camera Images for Driver Assistance," Intelligent Vehicles Symposium, IEEE Las Vegas, NV, Jun. 6, 2005 (6 pages).

(Continued)

*Primary Examiner* — Joseph Avellino
*Assistant Examiner* — Aftab Nasir Khan
(74) *Attorney, Agent, or Firm* — Osha Liang LLP

(57) ABSTRACT

A method for image-based weather condition detection, using image processing methods in moving vehicles, is described. The method includes detecting road weather conditions by identifying a group of bright pixels in video images produced by an image-based road characterization, and determining whether the bright pixels are caused by reflections due to one of rainfall, snowfall, a wet surface, or a snowy surface, where a driving assistant system includes a lane-keeping system.

14 Claims, 6 Drawing Sheets

U.S. PATENT DOCUMENTS

| | | | |
|---|---|---|---|
| 6,313,454 | B1 | 11/2001 | Bos et al. |
| 6,535,141 | B1 * | 3/2003 | Doherty ........................ 340/905 |
| 6,831,261 | B2 | 12/2004 | Schofield et al. |
| 2002/0181739 | A1 * | 12/2002 | Hallowell et al. ............. 382/100 |
| 2003/0191568 | A1 * | 10/2003 | Breed .............................. 701/36 |
| 2004/0189447 | A1 * | 9/2004 | Okubo et al. ............... 340/425.5 |
| 2005/0180149 | A1 * | 8/2005 | Albou et al. .................. 362/459 |
| 2006/0104481 | A1 * | 5/2006 | Demro et al. ................. 382/104 |
| 2007/0047809 | A1 | 3/2007 | Sasaki |
| 2007/0053671 | A1 | 3/2007 | Garg et al. |
| 2008/0291276 | A1 * | 11/2008 | Randler ........................ 348/149 |
| 2009/0016636 | A1 * | 1/2009 | Kasashima et al. ........... 382/274 |

OTHER PUBLICATIONS

Yamada, M., Ueda, K., Horiba, I., and Sugie, N., "Discrimination of the Road Condition Toward Understanding of Vehicle Driving Environments," IEEE Transactions on Intelligent Transportation Systems, IEEE Service Center, Piscataway, NJ vol. 2, No. 1, Mar. 1, 2001 (6 pages).

Sharma, A., Bullock, D., Peeta, S., and Krogmeier, J., "Detetction of Inclement Weather Conditions at a Signalized Intersection Using a Video Image Processing Algorithm," Digital Signal Processing Workshop, 12th Signal Processing Education Workshop, 4th IEEE, Sep. 1, 2006 (6 pages).

Kuno, T., and Sugiura, H., "Detection of Road Conditions with CCD Cameras Mounted on a Vehicle," Systems and Computers in Japan, Wiley, Hoboken, NJ, vol. 30, No. 114, Dec. 1, 1999, (12 pages).

Roser, M., and Moosmann, F., "Classification of Weather Situations on Single Color Images," Intelligent Vehicles Symposium. IEEE, Piscataway, NJ, Jun. 4, 2008 (6 pages).

International Search Report from PCT/EP2008/007072 dated Mar. 24, 2010 (3 pages).

\* cited by examiner

METHOD AND SYSTEM FOR WEATHER CONDITION DETECTION WITH IMAGE-BASED ROAD CHARACTERIZATION

FIELD OF THE INVENTION

The present invention relates to a method and system for weather condition detection with image-based road characterization by image processing methods and systems for detecting roadway scenes in vehicles.

In motor vehicles several so called driving assistance systems are known, often just called assistants, using video images captured by a single video camera or by several video cameras arranged e.g. in the front and/or in the back of a motor vehicle to detect e.g. road lane markings and road boundaries, obstacles, other road users and the like, or to survey and/or display the frontal and/or back area of a motor vehicle e.g. when parking, particularly when backing into a parking space or when parallel parking.

Known applications are e.g. so called lane-keeping assistants, lane departure warning assistants, collision warning assistants, parking assistants and the like.

Further, lighting and windshield wiper assistants are known, which detect weather condition in a simple way by identification of rain drops or snowflakes on a windshield or on another appropriate surface, e.g. in order to engage the lighting or the windshield wiper of a motor vehicle.

BACKGROUND OF THE INVENTION

From US 2007/0053671 A1 a method is known to detect rain by focusing on and counting individual drops. Thereby rainfall is measured using an image acquisition device by first adjusting the image acquisition device's settings to enhance the visibility of rain, including adjusting at least one of the focal length, the F-number, and the exposure time. Second a plurality of images is acquired with the image acquisition device. Third a measure of the rain rate is computed based on counting the number and size of raindrops in each of the plurality of images. Disadvantageously this method needs to focus on the drops, which means that the background will probably be out of focus. This is a drawback because in order to combine such a method with a driving assistant system primarily interested in detecting e.g. the bounds of a roadway or lane, an extra image acquisition device like e.g. an extra video camera is required to bring the roadway into face.

From US 2007/0047809 A1 an environment recognition device is known, which acquires environment information and makes color-based decisions to determine what is seen. Disadvantageously thereby knowledge of the color of things is required. Particularly this is a drawback because color is not always available, e.g. either since a color camera is not being used, or since at night color information is significantly reduced.

From U.S. Pat. No. 6,831,261 a headlamp control system for a motor vehicle is known, which controls a headlamp of the motor vehicle in response to identification of at least one of a headlamp of another vehicle. The headlamp control system can also determine weather conditions. To determine weather conditions the fact is used that at fog or rain a bright light source of a head- or taillight of an oncoming or a preceding motor vehicle is surrounded by a transition region between the intensity of the light source and the black background. By placing appropriate limits on the size of the transition region, fog or light rain, or a mixture of both or other weather conditions can be detected. Furthermore fog or fine rain is detected by analyzing the effects of headlights of oncoming motor vehicles as reflected off of moisture particles in the air. Additionally spatial filtering is used to detect rain on the windshield. Thereby the effect is used that when a droplet of rain or a snowflake is on the windshield, a lack of continuous variation of differences between adjacent pixels or pixel groups of an imaging array sensor is created. This has the tendency to reduce the first derivative of the pixel, a condition which can be determined by processing. Disadvantageously also color information is required to distinguish between head- and taillights in the field of view. Another drawback of the headlamp control system is, that it looks for raindrops or snowflakes on the windshield and/or that it analyzes the effects of headlights of oncoming motor vehicles as reflected off of moisture particles in the air. Thus the headlamp control system is only capable to detect e.g. rain or snow during rain- or snowfall and thus during raindrops or snowflakes are on the windshield or in the air, but it is not capable to detect e.g. a wet or snow-covered road, like e.g. after rain- or snowfall.

From U.S. Pat. No. 6,313,454 a rain sensor system for a motor vehicle is known, looking for raindrops on a window of a motor vehicle, e.g. on the windshield. Thereby an imaging array sensor is directed toward a window of a motor vehicle. The rain sensor system counts the number of visible edges, using extra illumination if required at night. A drawback of this rain sensor system is that an extra imaging array sensor is required directed toward the window, which imaging array sensor cannot be used to detect e.g. road lane markings and road boundaries, obstacles, other road users and the like, or to survey and/or display the frontal and/or back area of the motor vehicle.

SUMMARY OF THE INVENTION

It is thus an object of the invention to develop a new method and system for image-based road weather condition detection.

The object of the invention is met by a method for image-based weather condition detection according to claim 1.

Thus the shortcomings of the prior art are overcome and additional advantages are achieved by a method for image-based road weather condition detection, according to which method road weather conditions are detected by identifying bright pixels or a group of bright pixels in video images and by deciding whether or not said bright pixels are caused by reflections due to rain- or snowfall and/or due to a wet or snowy surface. A method according to the invention allows e.g. to detect snow, either falling or on the ground, and can be used in a moving vehicle equipped with an imaging system including a video camera.

According to the invention, weather conditions, particularly rain- or snowfall as well as wet or snowy surfaces, are detected by identifying bright pixels or a group of bright pixels n video images and by deciding whether said bright pixels are caused by reflections due to rain- or snowfall and/or due to a wet or snowy surface, or whether those bright pixels or a group thereof are caused by other reason.

The method for image-based weather condition detection according to the invention uses the fact, that weather conditions have characteristics that allow them to be visually detected. For instance it is possible to see that it is snowing because white flakes randomly fall from the sky. Further it is possible to see that a road is wet at night because of the way it reflects. It is also possible to see whether it is actively raining from the way these reflections appear. Additionally it is possible to see that a road has snow on it, or is snowy from its color, and possible markings like e.g. tire tracks on it. Also snow on the road can be detected by the wide strips of possible triangular shape it causes.

Said method according to the invention has the advantage over the state of the art, that it allows using the same video images like e.g. a driving assistant system require also to detect weather conditions, which weather conditions could confuse such a driving assistant system e.g. an image based road recognition system. The method according to the invention does not specifically look at individual raindrops or snowflakes on the windowshield, unlike prior art.

To identify bright pixels in video images preferably the relative brightness of pixels compared to neighboring pixels or the relative brightness of pixels compared to an average brightness is used.

Comparing them with neighboring pixels in a video image or comparing them with an average brightness can identify bright pixels. An average brightness can be achieved by averaging the brightness of all pixels of a particular image of interest, or by determining an expected or global average brightness of pixels of images e.g. at normal weather condition.

According to a preferred embodiment of the invention, day and night conditions are considered to identify bright pixels in video images. This is advantageous due to the different illumination in these conditions and the different thresholds required to set to label a pixel or a group of pixels as bright.

In a preferred embodiment of said invention, falling snow is detected by the nearness of the identified bright pixels to each other. According to this preferred embodiment of the invention, falling snow is detected by its not being connected with other flakes. Snow on the road further can be detected by the wide strips of possible triangular shape it causes.

In another preferred embodiment of said invention, the nearness of the bright pixels is evaluated by measuring which fraction of bright pixels of a total number of bright pixels is near enough to another bright pixel to qualify as road markings, wherein if the ratio $$\frac{\text{Number of bright pixels near enough to another bright pixel}}{\text{Number of bright pixels total}}$$

is near 1.0, most of the bright pixels have nearby neighbors and are therefore likely part of road markings, and wherein if the ratio is near 0.0, nearly none of the bright pixels have nearby neighbors and therefore likely come from snow.

Falling snow also appears as bright single, or possibly multiple, bright pixels. These bright pixels can be detected e.g. with a road marking finder of e.g. a lane-keeping assistant or of a lane departure warning assistant. Thereby the fact is used, that in contrast to road markings, snow is spread in a random pattern, and the bright pixels are generally less near each other. The histogram of the nearest distances between bright pixels correlates with snowfall intensity. That is, a preponderance of large distances correlates with light snowfall, a preponderance of medium distances correlates with heavier snowfall and a preponderance of small distances correlates with heavy snowfall and/or road markings.

To decide whether snow is falling or not, preferably the ratio $$\frac{\text{Number of bright pixels near enough to another bright pixel}}{\text{Number of bright pixels total}}$$

is compared with a threshold, wherein if the ratio is less than the threshold, snow is falling, and wherein if the ratio is greater than or equal to the threshold, snow is not falling.

An averaging process can be used to remove periodic rises and falls in the ratio, which rises and falls are caused by dashed road markings coming into the field of view and then passing out of the field of view. This makes the snow falling/snow not falling decision more robust.

In an additional preferred embodiment of said invention, falling snow is detected by using the expected motion of identified bright pixels that are initially defined as candidate marking objects to determine, whether these bright pixels may actually be or belong to markings.

Thereby the fact is used, that if the candidate is a marking on the road, it can be calculated where it will be in the next image from knowledge of the own motion of the own motor vehicle. Should the candidate at frame n not appear near enough to a candidate at frame n+1, then the candidate in frame n is declared to be a snowflake. To decide, whether the candidate at frame n appears near enough to a candidate at frame n+1, also a threshold can be used. A too high fraction of candidates that are labeled as snowflakes, compared with the total number of candidates, leads to a decision that snow is falling. A sufficiently low fraction of candidates labeled as snowflakes leads to a decision that snow if not falling.

According to another preferred embodiment of the invention, snow on a road is detected by identifying bright pixels forming wide strips on the road that are lighter than the surrounding roadway. Said wide strips on the road that are lighter than the surrounding roadway are indicative of fallen snow.

Snow is generally white, i.e. lighter than other portions of a roadway. According to the invention, this fact, together with the knowledge of a typical road appearance, allows a detection of snow on a road.

According to a particularly preferred embodiment of the invention, snow on a road can also be detected by identifying bright pixels forming light strips, whose width varies as one travels. Such light strips having a scale of variation of meters or tens of meters of distance traveled suggest that vehicles have been changing lanes, creating approximately triangular snow wedges that are the light strips being detected. To perform this method according to the invention, it is possible to reverse the usual logic for lane marking detection, which requires markings to be lighter than their surroundings, and look for narrow, darker stripes on a light background. Vehicles driving in snow and revealing the road surface beneath often make such darker stripes.

According to a preferred embodiment of the invention, wet roads are detected by identifying bright pixels belonging to reflections whose origin is either overhead or roadside lights or vehicles ahead, wherein the persistence of said reflections is used to decide, whether or not one or the own vehicle is currently in a wet area.

If the own vehicle is in a wet area, this can be signaled to other systems, like e.g. a traction control system, whose behavior can then be modified appropriately.

The intensity of falling rain preferably is detected by the edge width of reflections or light sources given by bright pixels identified in video images. Said reflections have a plateau-like appearance of their graph of intensity, with a plateau on top and a falloff at the sides. More extended sides, caused by dispersion from falling rain, correlate with heavier rainfall.

According to another particularly preferred embodiment of the invention, in order to determine the extensions of the sides of the graph of intensity, a half-intensity point is defined as that location on each side of the plateau where the intensity, i.e. the gray level, has dropped to half that of the maximum value in the reflection or light source center, wherein the distance of this half-intensity point from the edge of the plateau is indicative of the intensity of the rainfall.

To look for bright pixels to be identified in video images as belonging to reflections, preferably an area of reflections located on the hood of the own vehicle is chosen. This is advantageous since the hood of the car is a less variable background than the road.

According to the invention, rain is detected by the presence of reflections on the road, wherein its intensity is detected by the gradients at the edges of these reflections.

In a particularly preferred embodiment of the invention, said method is performed by a computer program product stored on a computer usable medium comprising computer readable program means for causing a computer to perform the method mentioned above, wherein said computer program product is executed on a computer.

The foregoing, together with other objects, features, and advantages of this invention can be better appreciated with reference to the following specification, claims and drawings.

BRIEF DESCRIPTION OF THE DRAWINGS

Preferred embodiments of the invention are described in the following with reference to the drawings, with.

Figure 1:
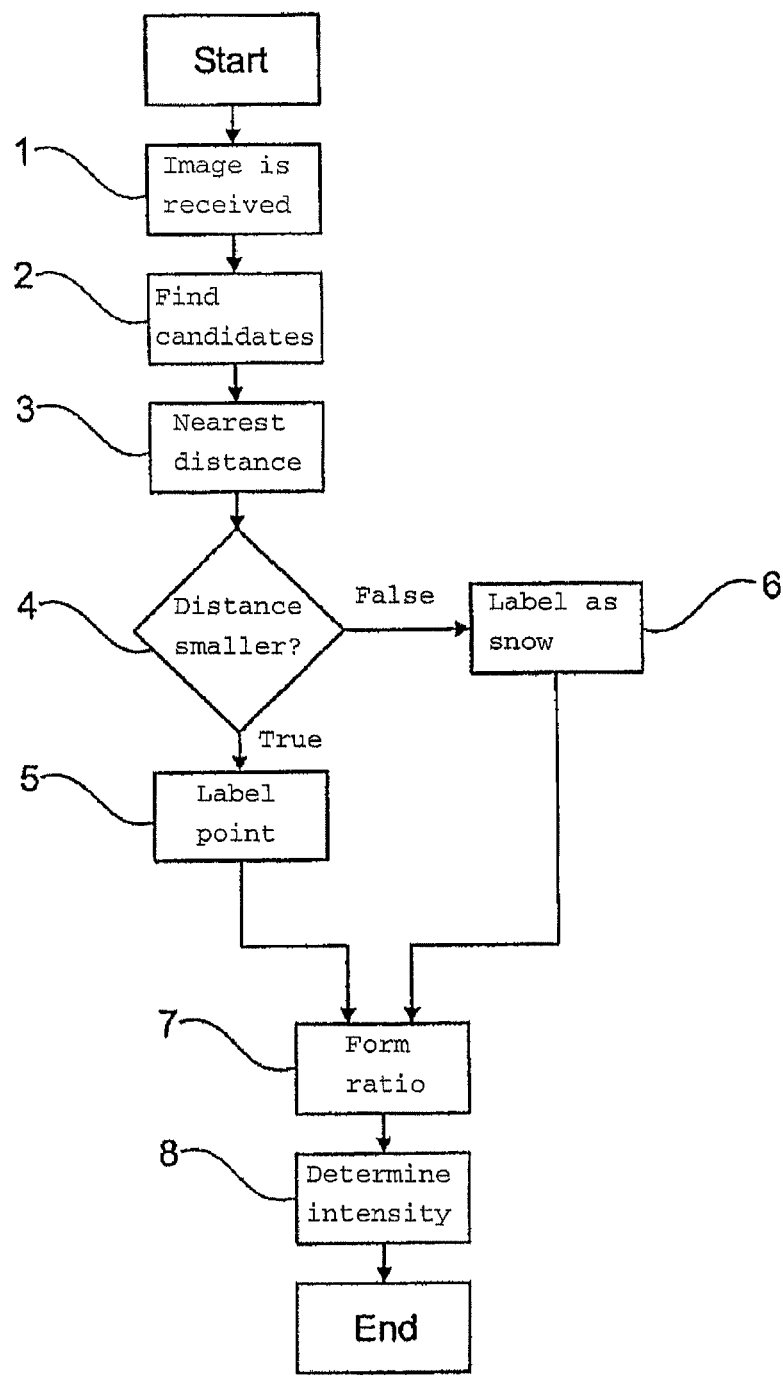
FIG. 1 showing a flowchart of a falling snow detection process according to the invention.

A method for image-based road weather condition detection according to the invention uses the fact, that weather conditions have characteristics that allow them to be visually detected. For instance it is possible to see that it is snowing because white flakes randomly fall from the sky. Further it is possible to see that a road is wet at night because of the way it reflects. It is also possible to see whether it is actively raining from the way these reflections appear. Additionally it is possible to see that a road has snow on it or is snowy from its color and markings like e.g. tire tracks on it. Also snow on the road can be detected by the wide strips of possible triangular shape it causes.

All these characteristics have in common that they appear as at least relatively bright pixels in video images. Thereby at least relatively bright means either that they are brighter than neighboring pixels or that they are brighter than an average brightness, e.g. an average brightness of the pixels of the particular image or an expected or global average brightness of pixels of images e.g. at normal weather condition. Also day and night conditions can be considered.

Thus extracting bright pixels within video images and then identifying whether or not these bright pixels are caused by reflections, like e.g. by reflections from snowflakes, by reflections from snowy surfaces, or by reflections from wet surfaces, allows an image-based detection of road weather conditions.

By way of two examples, each one representing an own detection of falling snow approach, a detection of falling snow according to the invention is described in the following.

A first detection of falling snow approach according to the invention is performed as follows: Snow consists of white flakes falling in a random pattern. This randomness has no coherence, i.e. it does not form persistent discernible patterns, such as e.g. stripes. According to the invention preferably a camera system is used that is able to detect such persistent stripes. More specifically, the camera system is preferably equipped with a lane departure warning system that looks for lane markings on the road, including Botts dots. The persistent stripes consist of individual bright pixels, near each other, that persist in time, or repeat, in the case of dashes and Botts dots. According to the invention, the nearness of the bright pixels to each other is used to detect falling snow.

Falling snow also appears as bright single, or possibly multiple, pixels or a group of pixels. These bright pixels can be detected e.g. with a road marking finder of e.g. a lane-keeping assistant, or of a lane departure warning assistant. Thereby the fact is used, that in contrast to road markings snow is spread in a random pattern, and the bright pixels are generally less near each other. Therefore, according to the invention, the nearness of the pixels is evaluated by measuring which fraction of bright pixels of a total number of bright pixels is near enough to another bright pixel to qualify as road markings. The result is a ratio:

$$\frac{\text{Number of bright pixels near enough to another bright pixel}}{\text{Number of bright pixels total}}$$

When this ratio is near 1.0, most of the bright pixels have nearby neighbors and are therefore likely part of road markings. When this fraction is near 0.0, nearly none of the bright pixels have nearby neighbors, and therefore likely come from snow.

A decision, whether snow is falling or not, preferably is made by comparing this ratio with a threshold. When the ratio is less than the threshold, snow likely is falling. When the ratio is greater than or equal to the threshold, snow is likely not falling. Two different thresholds may be set and used to increase decision certainty, this by allowing for a region of uncertainty.

With dashed road markings, periodic rises and falls in the ratio are expected as dashes come into view and then pass out of the field of view. Preferably an averaging process is used removing this periodicity and making the snow falling/snow not falling decision more robust.

FIG. 1 shows a flowchart of a falling snow detection process based on the above ratio. Thereby in a first step 1 an image, e.g. an image of a video camera is received. In a second step 2 road or lane marking point candidates are found among the pixels within the image received. In a third step 3 the nearest distance to the next candidate is found for each candidate. In a fourth step 4 a decision is made, whether or not the nearest distance of a road or lane marking point candidate to the next, i.e. neighboring road or lane marking point candidate is smaller than a threshold. If this is true, the road or lane marking point candidate in a fifth step 5 is labeled as road or lane mark point. If this is false, the candidate in a sixth step 6 is labeled as snow. In a seventh step 7 a ratio of snow to road or lane mark point is formed in order to determine a snowfall intensity in an eights step 8.

Figure 2:
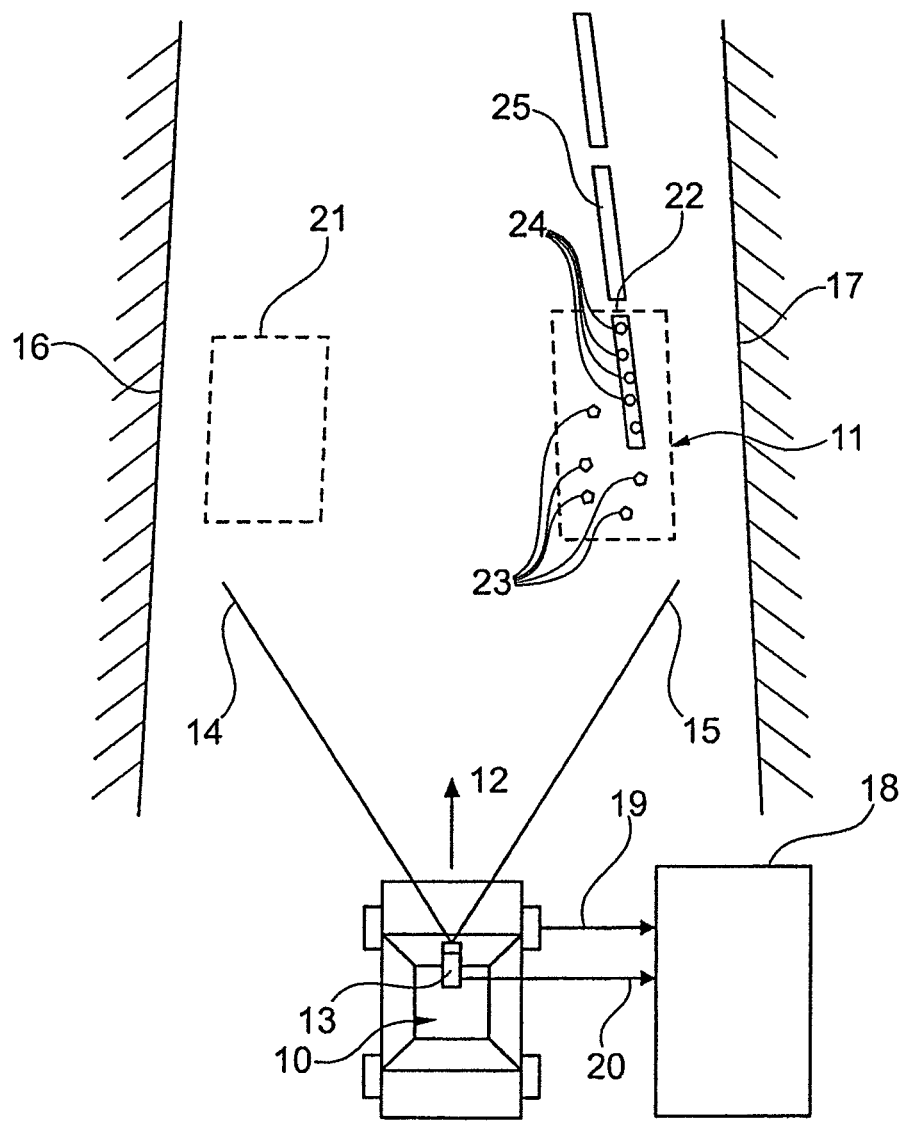
FIG. 2 showing a video image of a scene with falling snow.

FIG. 2 shows schematically a situation of a vehicle 10 as a carrier of a video image processing system, which moves on a road 11 toward an arrow 12. The video image processing system of the vehicle 10 contains a digital video camera 13 as an image sensor, which evaluates a road range between broken lines 14 and 15. The road 11 is bounded by a markings 16 and 17. A computer based electronic circuit 18 evaluates the signal at an input 19, produced by the digital data of the camera 13. Additionally at an input 20 also the current speed data of the vehicle 10 can be evaluated.

The evaluation range of the road 11 shows can also be seen as a video image of the above described video image processing system. In particular in FIG. 2 is shown of a scene with falling snow. Rhomboids 21, 22 within the video image are examined for bright points 23, 24 that might be snow. As can be seen in the right rhomboid 22, approximately half of the bright points, namely the bright points 24 are associated with a dashed road marking 25, while the other half, namely the bright points 23 are isolated and associated with falling snowflakes. The ratio above would therefore be approximately 50%, which is indicative of falling snow, as is visible in the scene shown in FIG. 2.

The threshold that defines near to another pixel preferably is chosen in a way that markings are properly accepted, with most of the pixels defining them labeled as having near neighbors. The measurement of nearness is advantageously done with the Manhattan distance and in the image plane. The evaluation approach preferably evaluates image pairs first in that direction having the larger evaluation window dimension. If the distance in that dimension already exceeds the threshold, the distance evaluation in the other dimension is not done. When too few pixels are found, it is difficult to make a decision, if snow is falling, or not. Thus in such cases preferably the falling snow detection is not active. This is e.g. because few pixels may be found, for example, when Botts dots are used as road markings.

A second detection of falling snow approach, according to another embodiment of the present invention, uses the expected motion of detected bright pixels that are candidate marking objects. Thereby detected bright pixels initially are taken as candidate marking objects, wherein later it is determined whether these may actually be markings. If a candidate is a marking on the road, it can be calculated where it will be in the next image, using knowledge of the own motion of the own motor vehicle. Should the candidate at frame n not appear near enough to a candidate at frame n+1, then the candidate in frame n is declared to be a snowflake. To decide, whether the candidate at frame n appears near enough to a candidate at frame n+1, also a threshold can be used. A too high fraction of candidates that are labeled as snowflakes, compared with the total number of candidates, again leads to a decision that snow is falling. A sufficiently low fraction of candidates labeled as snowflakes leads to a decision that snow if not falling.

Figure 3:
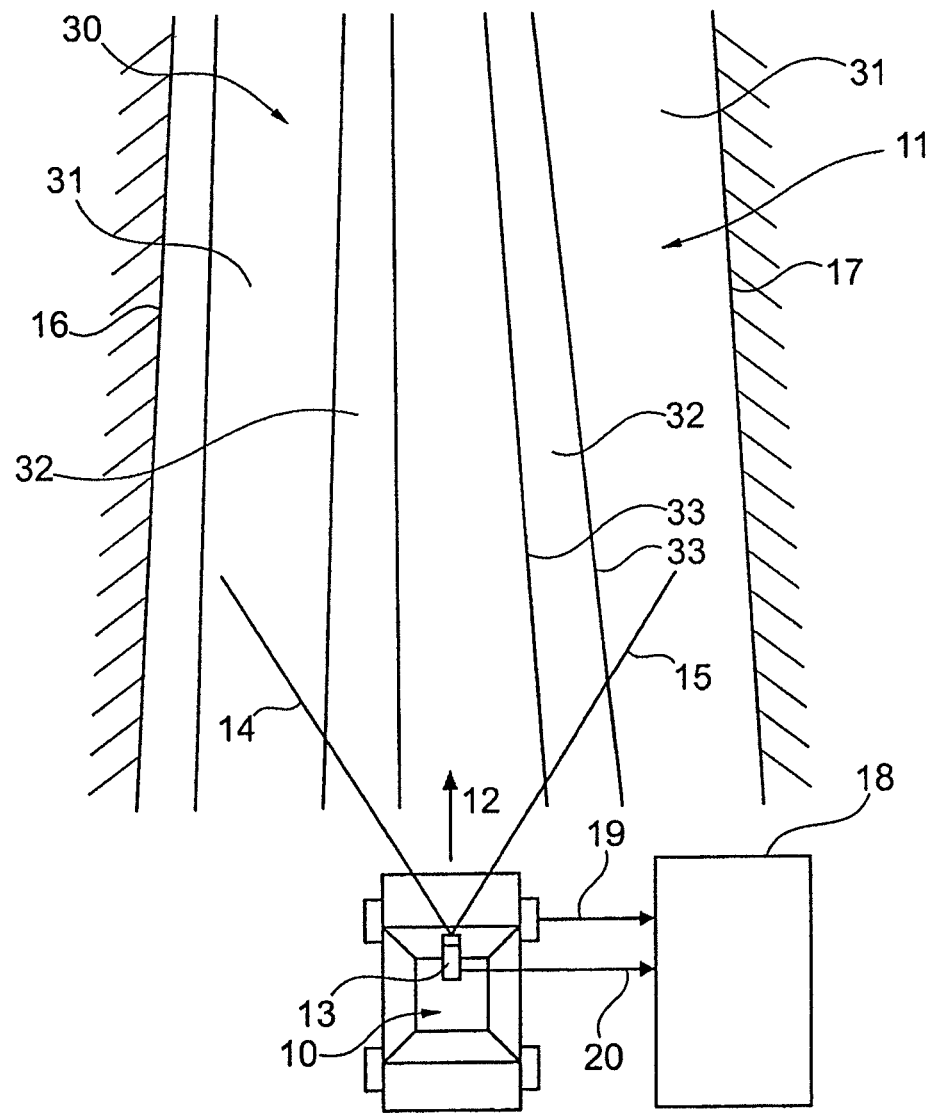
FIG. 3 showing a video image of a scene with snow on a road.

FIG. 3 shows a scene 30 at the road 11 also with snow on the road 11. According to the invention, a detection of snow on road is performed as follows. Snow is generally white, i.e. lighter than other portions of a roadway. According to the invention, this fact, together with the knowledge of a typical road appearance, allows a detection of snow on a road. In particular, in FIG. 3 are wide strips 31, which are lighter than the surrounding portions 32 of the road 11, so they are indicative of fallen snow, as can be seen in the FIG. 3. Additionally, light strips whose width varies as one travels, with a scale of variation of meters or tens of meters of distance traveled, suggest that vehicles have been changing lanes, creating snow wedges that can be detected. This also indicates snow on the road.

According to the invention it is also possible to reverse the usual logic for lane marking detection, which requires markings to be lighter than their surroundings, and look for narrow darker stripes 32 on a light background. Vehicles driving in snow and revealing the road surface beneath often make these darker stripes 32.

Specifically, preferably the width of all strips 31 brighter than their background is monitored during detection of snow on the road. Within a single frame, the more percentage roadway width such strips 31 cover, the more likely that there is snow on the road.

Over multiple frames, during detection of snow on the road, the edges 33 of a lighter strips 32 are tracked and their width is monitored. Referring to the example shown in FIG. 3, two parallel edges 33 surrounding a darker central stripe 32 hint that a lane change has occurred, something that is unusual to see on a snow free roadway.

Strips, whose width varies smoothly, with a relatively large variation, again signal the presence of snow, because normal road markings typically only have a width variation of a few centimeters, this due to wear, etc. These quantities and events preferably are given to a rule-based classifier. This classifier outputs whether snow is present on the roadway or not.

Figure 4:
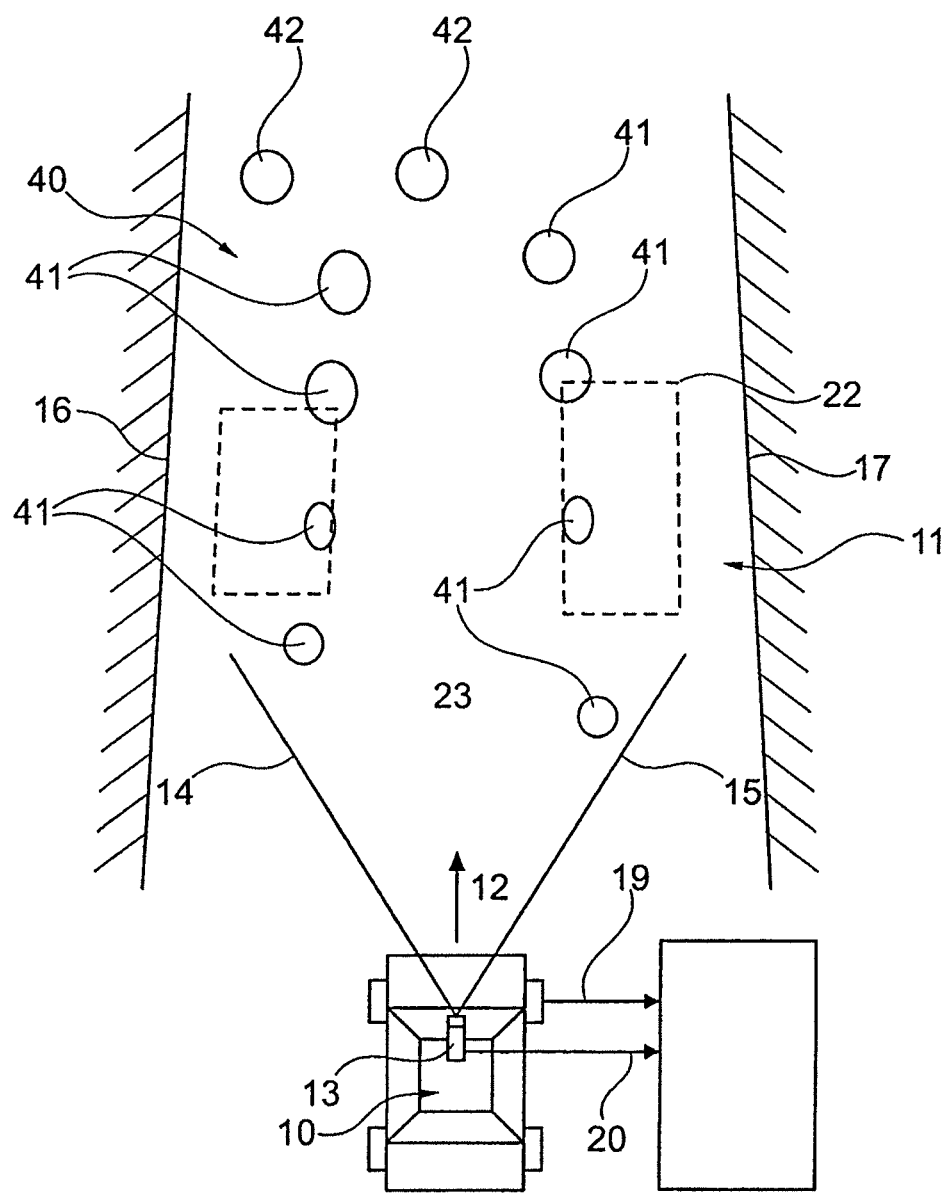
FIG. 4 showing a video image of a scene with a wet road reflecting something.

A method according to the invention also allows e.g. to detect wet roads. Wet roads reflect something, e.g. light sources, particularly noticeable at night. FIG. 4, for example, shows a video image 40 of a scene with a wet road with such reflections 41, whose origin is either not shown overhead (roadside) lights or vehicle lights 42 ahead. A detection of wet roads according to the invention uses the persistence or recurrence of these reflections 41 to decide, whether the own vehicle is currently in a wet area. If the own vehicle is in a wet area, this can be signaled to other systems, like e.g. a traction control system, whose behavior can then be modified.

According to the invention it is foreseen to identify bright pixels as belonging to reflections 41 on the road, or not. These reflections 41 occur in columns. The reflections 41 can thus be described by the number of pixels in them or the number of columns in them. The remaining non-reflection pixels are described by their number. Of these, as discussed by example further below, same can be described as originating from light sources 42 or overhead lights, of which the number is known. Thereby the number of grouped pixels can be used, as well as the number of individual pixels.

Thus three classes for bright pixels occur:
reflection,
light source,
neither reflection nor light source.

These can be either grouped, for example by columns, or taken individually. Non-reflection and non-light source pixels typically belong to road markings, which can then be described by their number, like e.g. "two dashes on the left".

Ratios are now formed between these quantities. Excessive numbers or ratios of reflections or bright pixels identified as reflections indicate that the road is wet. Preferably persistence is applied to each individual detection, prolonging the information "wet road detected on this frame". If a time history of detections has a significant fraction classified as "wet roads", the road is flagged wet. After a sufficiently long period of dry road detections, the road is flagged dry.

Figure 5:
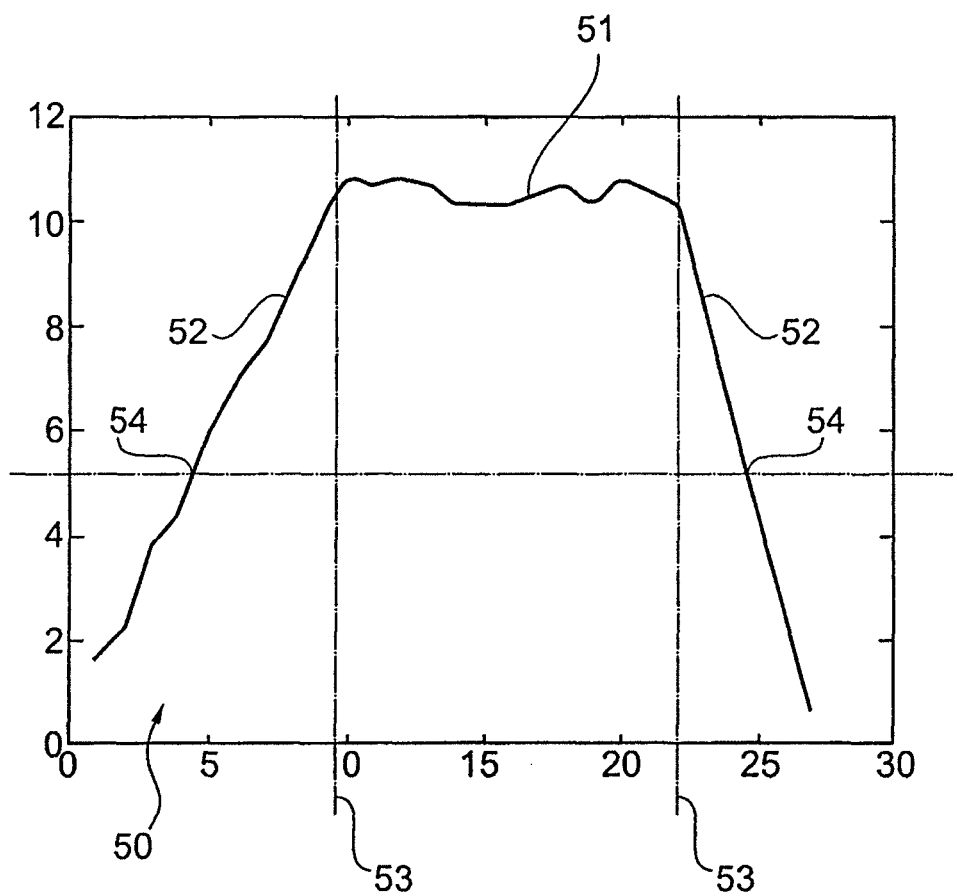
FIG. 5 showing a graph of the intensity of a reflection stripe.

With the method according to the invention it is also possible to detect the intensity of falling rain. According to an embodiment of the invention, actively falling rain is detected by the edge width of bright pixels identified that belong to reflections or light sources. FIG. 5, for example, shows a graph 50 of the intensity of a typical plateau-like appearance of a reflection stripe. As shown in FIG. 5, reflections or light sources typically tend to look like, with a plateau 51 on top and a falloff at the sides 52. The plateau 51 is formed of e.g. saturated pixels or pixels having a maximum pixel gray level.

A more extended side 52, caused by dispersion from falling rain, correlates with heavier rainfall. According to the invention this extension preferably is exploited to detect the intensity of falling rain.

Figure 6:
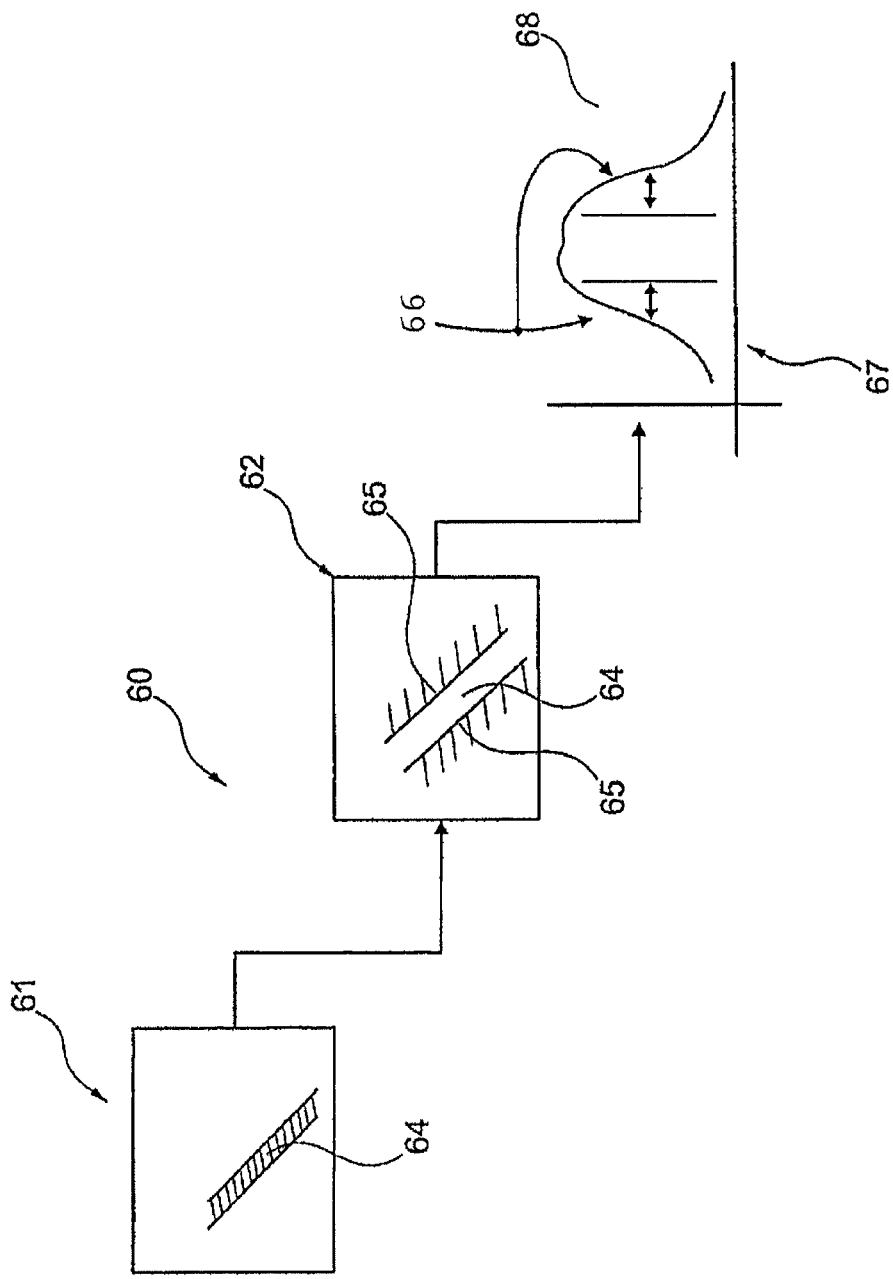
FIG. 6 showing the principle of a rain detection process according to the invention in a flowchart.

An idea behind a rainfall intensity measurement according to the invention is a correlation between the rainfall intensity and the blurring of road marks and/or reflections. FIG. 6 shows a flowchart 60 depicting an example of the principle of a rain detection process. Normally, i.e. at dry conditions, e.g. a road mark 64 has clear or sharp sides in an image, as shown in the box 61. Rain blurs this image, as shown in the box 62. Due to this blurring, the road mark has softer sides 65 within the image. The result of a directed integration of the brightness or gray level of the road mark across the road mark is a graph 66 shown in the box 67, which graph 68 is similar to the graph 50 shown in FIG. 5. Thereby the width of the softened sides correlates to rain and mist blurring and their intensity.

Referring to FIG. 5, preferably a half-intensity point 54 is defined as that location on each side of the plateau 51 where the gray level has dropped to half that of the maximum value in the reflection or light source center. The distance of this half-intensity point 54 from the edge 53 of the plateau 51 is indicative of the intensity of the rain.

More generally, any number of methods, such as gradient histogram-based classification as top plateau 51 or sides 52, piecewise linear curve fitting, statistical comparison of a presumed edge with the presumed center, etc., can be used to define where the edges 53 are located, where they start, and where they stop. The absolute or normalized width of the edges 53 related to the plateau 51 brightness, or alternatively, their slopes, relates to the intensity of the falling rain.

It is important to mention that it is advantageous to combine, e.g. by averaging, the measurements from multiple light sources or reflections to reduce the overall measurement noise. It is advantageous to do this over time also, further reducing noise.

A method according to the invention can be performed by e.g. detecting road weather conditions, particularly rain and/or snow, by looking for reflections on the road and at the markings that may be there. In contrast to the state of the art, according to the invention it is not foreseen to specifically look at individual raindrops.

An example of a method for image-based weather condition detection using identification of reflections from falling snow and falling rain as well as reflections from snow and rain on the road within video images and requiring one camera is described in the following as well as a system performing such a method. Said system comprises the means mentioned there.

A computer coupled to a vehicle-mounted video camera can be used to identify and track objects, such as lane markings, vehicles, etc. Reflections from falling snow and falling rain as well as reflections from snow and rain on the road can disturb this identification.

Preferably the same vehicle-mounted camera is used to implement a method for image-based road weather condition detection according to the invention using identification or detection of reflections from falling snow and falling rain, as well as reflections from snow and rain on the road within video images. To identify pixels within video images that are associated with reflections an approach is used, according to which approach reflections within video images can be identified or are identified by a number of characteristics, including:

being relatively bright,
being generally on the road surface,
being generally vertical,
originating from a light source above them whose size depends on its height in the image, and
encompassing numerous connected pixels.

The identification preferably uses these five characteristics to identify reflections. For example a threshold is applied to find bright regions ahead of the vehicle. The threshold can be applied by either choosing those pixels whose gray level exceeds a global fixed threshold, or by choosing those pixels which are brighter than a percentile gray level of their surroundings C, or have low enough gradients where they join their over-threshold neighbors. In detail this means that pixel A would be a reflection candidate if B were over threshold. The gradients can be calculated from a histogram of the vertical edge gradients in that portion of the image. The thresholding and gradient conditions give relatively bright candidate pixels, which may be from reflections.

By assuming a geometry for the road surface, e.g. by assuming that the road surface is flat, and by combining this geometry with the orientation of the camera, an area to search for reflections can be better defined. In the following such an area is called area of reflections.

For example such an area of reflections preferably is chosen below the horizon, and thus on the road, and between a minimum and maximum range ahead of the camera.

Geometric knowledge of the camera-equipped vehicle taking the image allows choosing other areas of reflections, e.g. an area of reflections located on the hood of the vehicle taking the image, which may be useful. This is advantageous since the hood of the car is a less variable background than the road.

The camera orientation is used to support a range calculation, which associates a row in the image with a distance to that row in the real world. The range estimate associates the location of the top edge of a bright spot to compute how large the size of a light source, e.g. a headlight of an oncoming motor vehicle or a street lamp, can be at that range. Then all contiguous bright areas below this light source are eliminated. The headlights can be eliminated if desired also, as their approximate size is known.

More precisely, a search preferably is conducted downward from the row corresponding to the horizon to find the first bright pixel. The row location of this pixel corresponds to a range. The light source is constrained to a certain size at this range, considering that headlamps are generally not larger than a certain amount. Allowing for this size, all bright pixels below the lower edge of the light source are eliminated.

Light sources over the road cannot be assumed to have a given size. The spatial relationship though remains, with the reflection being in the same, or nearly the same, image column or columns as the light source. A search can be performed for locally bright pixels over the road and/or horizon, as may be seen, and then by moving downward, identify the again relatively bright pixels that are the reflections produced by the light sources.

Pixels within video images that come from reflections can be stored in various ways. The simplest is as a one-dimensional array, giving the indices of which image columns contain reflections and those that do not. An alternative is to store both the row and column of each pixel coming from a reflection, and eliminate these from further use. An option is to also store the upper and lower row bounds of the reflections in each column, of which there may be more than one pair. Finally, the bright, reflection-related pixels can be replaced with safe values that will not affect further processing, should this be desired. These safe values might be the average of the neighboring pixels, for example.

Further improvements in reflection detection can be gained by exploiting the connectedness of the bright pixels. The vertical linear feature in the left third of the image above can be removed by horizontally searching outward from bright pixels for any continuation. The horizontal search is stopped when either the difference to the original, more central, bright pixels becomes too large or when one reaches too large a gradient to the next, i.e. outward, pixel.

Thus, three types of pixels can be identified:
those associated with reflections,
those associated with light sources creating the reflections and
the other, non-reflection and non-light source pixels remaining.

The remaining pixels can be analyzed e.g. for lane markings, without having reflections that might disturb the results. The light sources can be tracked and used to follow potential vehicles. The separation lets each system function better by using only the inputs it requires.

If a color image is available, then the spectral characteristics of the reflections may be exploited to identify them. For instance, a relatively long, red stripe in the image is very likely from the taillights of a vehicle up ahead. The red channel of a color RGB image is ideally analyzed to find such reflections.

Finally, the texture and spectral characteristics of the reflections gives an indication of the road condition ahead. A wet road surface reflects differently than an icy road surface, which is generally more homogenous and bluer than its unfrozen counterpart.

While the present invention has been described in detail, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A method for image-based weather condition detection, using image processing methods in moving vehicles comprising a driving assistant system, the method comprising:
detecting road weather conditions by:
identifying a group of bright pixels in video images produced by an image-based road characterization, and
determining whether said bright pixels are caused by reflections due to one selected from a group consisting of rainfall, snowfall, a wet surface, or a snowy surface,
wherein falling snow is detected by a proximity of the group of bright pixels to each other, and wherein the proximity is evaluated using a histogram of nearest distances between bright pixels,
wherein the proximity of the group of bright pixels is evaluated by calculating which fraction of bright pixels of a total number of bright pixels is near enough to another bright pixel to qualify as road markings, wherein:

a ratio of $$\frac{\text{Number of bright pixels near enough to another bright pixel}}{\text{Number of bright pixels total}}$$

close to a value of 1.0 indicates that the group of bright pixels have nearby neighbors and are a part of road markings, and wherein the ratio close to a value of 0.0 indicates none of the group of bright pixels have nearby neighbors and are a result of snow.

2. The method according to claim 1, wherein identifying the group of bright pixels in video images comprises one of comparing a relative brightness of pixels to neighboring pixels, or comparing the relative brightness of pixels to an average brightness value.

3. The method according to claim 1, wherein identifying the bright pixels in video images comprises considering day and night conditions.

4. The method according to claim 1 wherein determining whether snow is falling, the ratio is compared with a threshold, wherein:
when the ratio is less than the threshold, snow is falling, and
when the ratio is greater than or equal to the threshold, snow is not falling.

5. The method according to claim 1, wherein an averaging process is used to remove periodic rises and falls in the ratio, wherein the rises and the falls are a result of dashed road markings coming into and passing out of a field of view.

6. The method according to claim 1, wherein falling snow is detected by using an expected motion of the group of bright pixels initially defined as candidate marking objects, wherein the candidate marking objects are used to determine whether the group of bright pixels are a part of markings.

7. The method according to claim 1, wherein the snowy surface of a road is detected by identifying bright pixels forming wide strips on the road that are lighter than the surrounding roadway.

8. The method according to claim 1, wherein the snowy surface of a road is detected by identifying bright pixels forming light strips comprising varying width while traveling on the road.

9. The method according to claim 1, wherein a the wet surface on a road is detected by identifying bright pixels belonging to reflections and originating from one of overhead roadside lights or vehicles ahead, wherein the persistence of said reflections is used to determine whether one is currently in a wet area.

10. The method according to claim 1, wherein searching for the group of bright pixels in video images belonging to reflections comprises choosing an area of reflections located on a hood of the vehicle to analyze light sources vertically above the road reflections.

11. The method according to claim 1, wherein an intensity of falling rain is detected by an edge width of reflections given by the group of bright pixels identified in video images, said reflections having a plateau-like appearance on a graph of intensity, with a plateau on a top and a falloff at the sides of the graph, wherein increased extended sides correlate with increased scattering and heavier rainfall.

12. The method according to claim 11, wherein determining extensions of the sides of the graph of intensity comprises defining a half-intensity point as a location on each side of the plateau where the intensity decreases to half of a maximum value in a center of the reflections, wherein the distance of the half-intensity point from an edge of the plateau is indicative of the intensity of the falling rain.

13. A computer program product stored on a non-transitory computer usable medium comprising computer readable program instructions for causing a computer to perform the method of claim 1, wherein said computer program product is executed on the computer.

14. A system for road weather condition detection with an image processing apparatus in a moving vehicle comprising a driving assistant system with a lane-keeping system, comprising:
- an electronic camera contained in the image processing apparatus for a video-based detection of the road, wherein the electronic camera is configured to capture scenes in front of the moving vehicle; and
- a computer-based electronic circuit configured to evaluate a group of pixels in the video images to determine whether bright pixels are caused by reflections of one selected from a group consisting of rainfall, snowfall, a wet surface, or a snowy surface, wherein falling snow is detected by a proximity of the group of bright pixels to each other, and wherein the proximity is evaluated using a histogram of nearest distances between bright pixels wherein the proximity of the group of bright pixels is evaluated by calculating which fraction of bright pixels of a total number of bright pixels is near enough to another bright pixel to qualify as road markings, wherein:

a ratio of

Number of bright pixels near enough to another bright pixel
Number of bright pixels total close to a value of 1.0 indicates that the group of bright pixels have nearby neighbors and are a part of road markings, and wherein the ratio close to a value of 0.0 indicates none of the group of bright pixels have nearby neighbors and are a result of snow.

* * * * *